Jan. 23, 1934. L. D. LOVEKIN ET AL 1,944,518
TEMPERATURE AND PRESSURE RELIEF VALVE DEVICE
Filed June 26, 1931 2 Sheets-Sheet 2
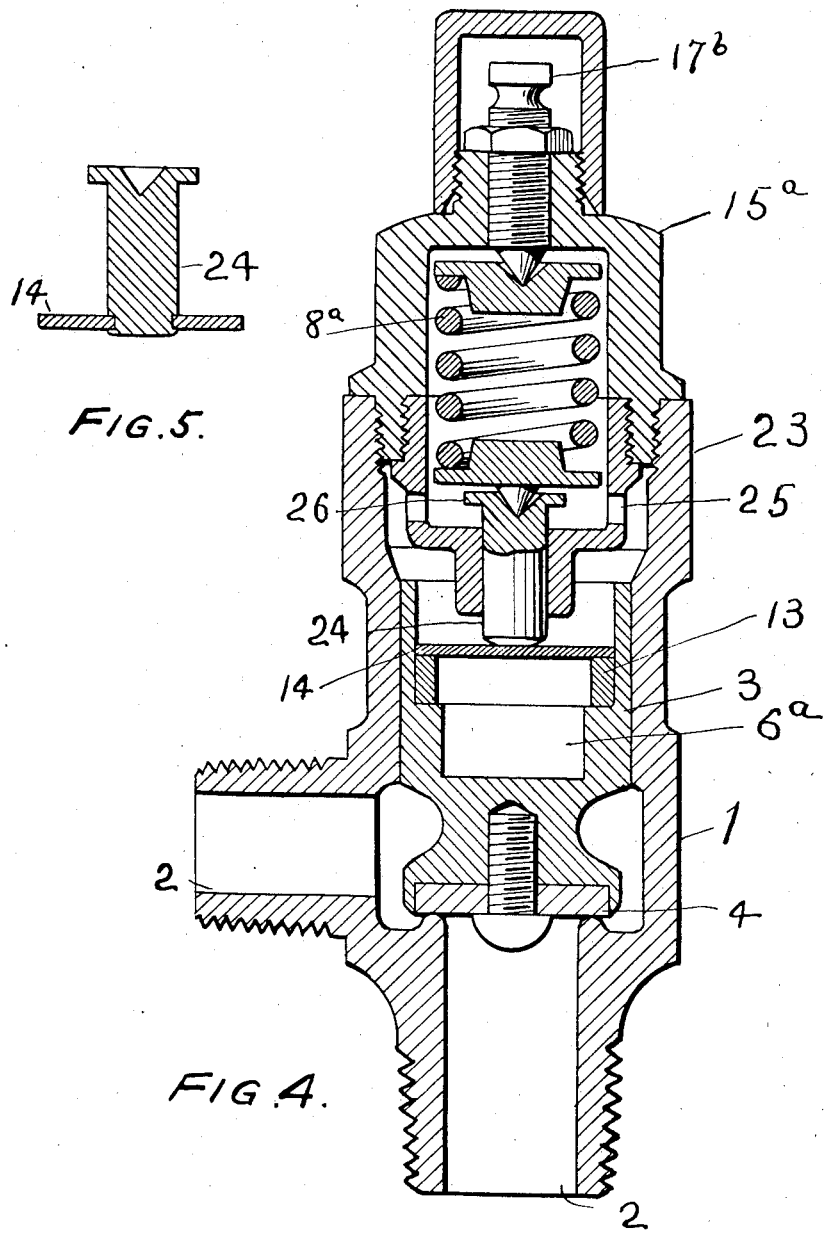
INVENTORS
Luther D. Lovekin and
Jean L. Le Gorre
Augustus B. Stoughton
ATTORNEY.
WITNESS:

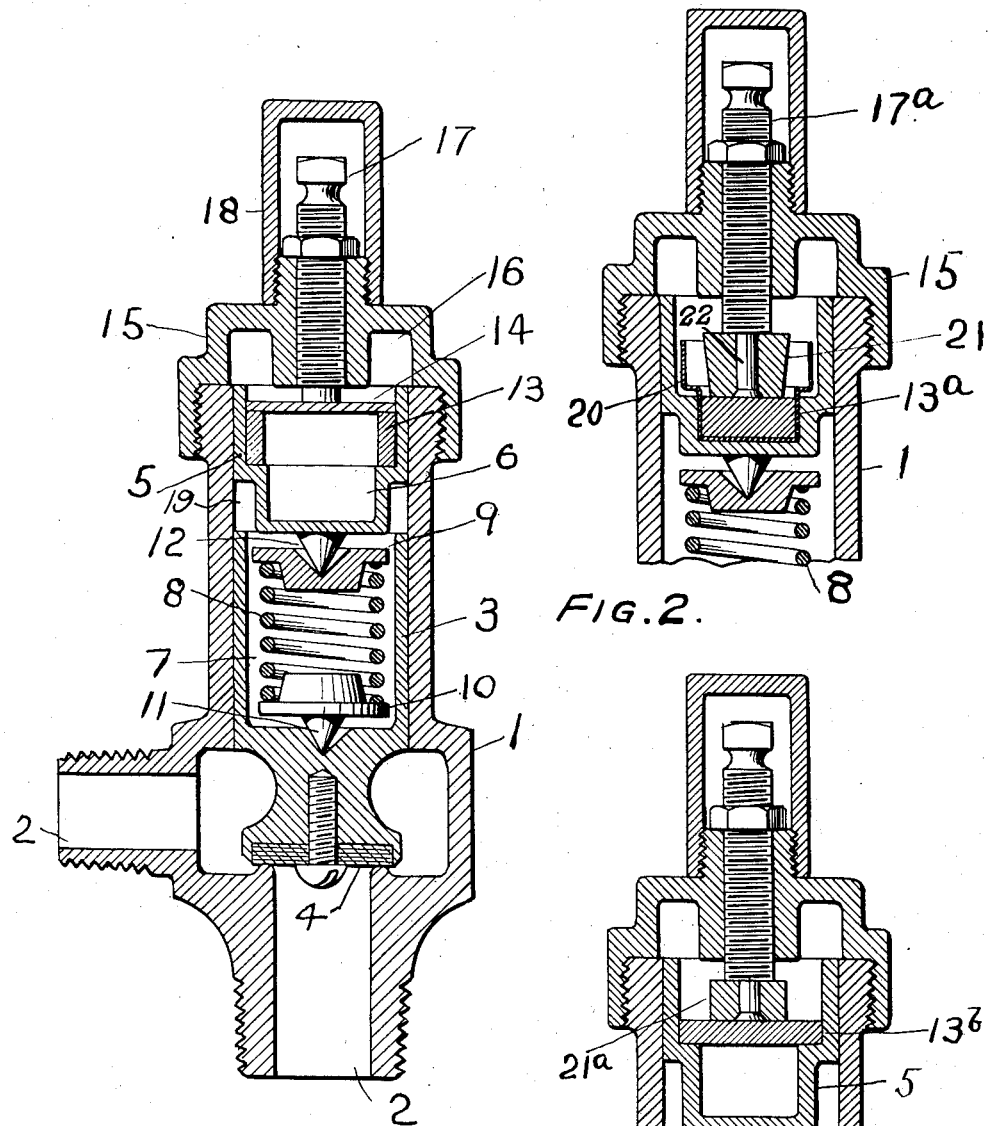

Patented Jan. 23, 1934

1,944,518

UNITED STATES PATENT OFFICE 1,944,518

TEMPERATURE AND PRESSURE RELIEF VALVE DEVICE

Luther D. Lovekin, Villa Nova, and Jean L. Le Gorre, Philadelphia, Pa., assignors to Kitson Company, Philadelphia, Pa., a corporation of West Virginia Application June 26, 1931. Serial No. 546,972

4 Claims. (Cl. 137—53)

The principal objects of the present invention are to provide a fusible element which, by reason of its form, will be comparatively quickly heated by contact with a heated member. Another object of the invention is to increase the sensitiveness of the valve.

Other objects of the invention will appear from the following description at the end of which the invention will be claimed.

A feature of the invention is a fusible metal element in ring form and in contact with a heated wall whereby heat from the water can be readily conducted to the fusible element so as to heat its comparatively small mass rapidly. Another feature of the invention is that the spring acts directly on the valve making it relatively very sensitive. Another feature is that pressure is applied directly to the fusible element which is arranged above the valve.

The invention comprises the improvements to be presently described and finally claimed.

In the following description reference will be made to the accompanying drawings forming part hereof and in which Figure 1 is a transverse central sectional view of a valve device embodying features of the invention and showing the same prior to the application of pressure to the spring.

Fig. 2 is a similar view of a portion of the device illustrating a modification of the invention.

Fig. 3 is a view similar to Fig. 2 illustrating another modification.

Fig. 4 is a view similar to Fig. 1 illustrating another modification, and

Fig. 5 is a detached sectional view illustrating a detail of construction.

Referring to Fig. 1, 1 is a casing having a ported spillway 2. 3 is a chambered valve stem slidable in the casing 1 and provided with a valve 4. There is a shouldered sleeve 5 having a chamber 6 and slidable in the casing 1. The sleeve 5 is adapted to slide into the chamber 7 of the valve spindle. A compression spring 8 is arranged in the chamber 7 of the spindle. 9 and 10 are spring holders of which one is shown as fitted with a point 11 adapted to rest in a cavity provided at the bottom of the chamber 7 in the spindle 3, and of which the other has a cavity for the reception of a point 12 provided outside of the cavity 6 in the sleeve. 13 is a ring of fusible metal arranged in the chamber of the sleeve and seated on the shoulder of the chamber. 14 is a plate mounted on the ring 13. 15 is a cap for the casing and it is provided with an annular recess 16 for the reception of the sleeve. 17 is a screw mounted through the cap and bearing on the plate 14. 18 is a cover for the screw.

In use the casing 1 is mounted, for example, into communication with a boiler, such as is used for a household supply of hot water, and in communication with the water therein. Should the temperature of the water rise, the water expands and in expanding creates pressure. If the pressure so created exceeds the setting of the spring, the valve 4 rises and water flows through the spillway until the pressure of the water is relieved. If the temperature of the water rises beyond the setting of the point of fusion of the element 13, heat conducted through the casing and wall of the sleeve 5 fuses or softens the ring 13, so that the pressure of the water, acting through the spring 8 permits the valve to move, and the parts resting upon it to rise, and the sleeve may enter the recess 16, and the top of the valve stem may enter the recess 19 provided by the shouldered form of the sleeve.

It may be remarked that as shown in Fig. 1, the spring 8 is not under compression and the valve is merely resting on the rim of the port. To put the spring under appropriate compression the adjusting screw 17 is screwed into the valve.

The cavity 6 in the sleeve serves to receive fused metal from the element 13.

The construction and mode of operation of the modifications about to be referred to are as above described except as will hereinafter appear.

In the modification shown in Fig. 2 the fusible element 13ª is in the form of a disk and is contained in a cup 20, so that in the event of its fusion the cup 20 serves to retain the fused metal. The screw 17ª is shown as provided with a conical head 21 which bears upon the fusible element 13ª and which is secured to the screw by a rivet 22.

In the modification shown in Fig. 3, a disk of fusible metal 13ᵇ is mounted on the shoulder provided in the sleeve 5, and the head 21ª is cylindrical instead of conical.

In the modification shown in Fig. 4 a ring of fusible metal 13 is seated on a shoulder provided in the chamber or cavity of the valve stem 3. The compression spring 8ª and its spring holders are arranged in a cavity or chamber in the bonnet 15ª of the valve and in a cap 23 threaded to the bonnet. A plunger 24 is interposed between the spring and the plate or element 14. 25 indicates openings for draining the chamber in which the spring 8ᵃ is arranged. In this construction the bonnet 15ᵃ and cap 23 with the spring plunger and set screw 17ᵇ can be removed as a unit and without changing the setting of the spring in order to replace or service the fusible element 13, and if the construction illustrated in Fig. 5 is employed, in which the plate 14 is riveted to the plunger, the plate 14 is also removed as a part of the unit above referred to. The cavity 6ᵃ serves to receive metal from the element 13 when the latter is fused.

26 is a stop and it serves to limit the pressure that can be put upon the plate 14 and element 13 by the screw 17ᵇ.

It will be obvious to those skilled in the art to which the invention relates that modifications may be made in details of construction and arrangement and matters of mere form without departing from the spirit of the invention which is not limited to such matters or otherwise than the prior art and the appended claims may require.

We claim:

1. A relief valve device comprising in combination a casing having a ported spillway, a chambered valve stem slidable in the casing and provided with a valve, a shouldered sleeve having a chamber and slidable in the casing, said sleeve being adapted to slide into the chamber of the valve stem, a spring arranged in the chamber of the valve stem, spring holders of which one has a point adapted to rest in a cavity provided at the bottom of the chamber in the valve stem and of which the other has a cavity for the reception of a point provided outside of the chamber in the sleeve, a ring of fusible metal arranged in the chamber of the sleeve and seated on the shoulder of the chamber, a plate mounted on the ring, a cap for the casing having a recess for the sleeve, a screw mounted through the cap and bearing on the plate, and a cover for the screw.

2. A relief valve device comprising in combination a housing including a spillway, a valve for the spillway and adapted to be exposed to fluid pressure, and a ring of fusible metal confined within the housing above the valve and in peripheral contact with a wall to which heat is conducted through the housing and which is adapted to control the opening of the valve.

3. A relief valve device comprising in combination a casing having a ported spillway, a chambered valve stem slidable in the casing and provided with a valve, a shouldered sleeve having a chamber and mounted in said casing, said stem and said sleeve being mounted for cooperating sliding movement, a cap for said casing having a chamber therein, a screw mounted through said cap and providing a bearing within said casing, a cover for said screw, a spring mounted within said casing between said screw and said valve, spring holders at the ends of said spring of which one has a point adapted to rest in a cavity in the valve and of which the other has a cavity therein to receive a point on the sleeve, a ring of fusible metal in the chamber in said shouldered sleeve in said casing and mounted in alignment with said spring between said screw and said valve, and a plate mounted on said ring to transmit pressure thereto.

4. A valve device comprising, in combination, a hollow casing having a valve seat therein, a valve cooperating with said seat and having a chamber therein, a member guided by the walls of said casing, a screw mounted in said casing, a spring interposed between said screw and said guided member, end members cooperating with said spring of which one has a cavity therein to receive the end of said screw and the other has a projection for cooperation with said guided member, and a ring of fusible metal mounted in the chamber in said valve and interposed between said valve and said guided member.

LUTHER D. LOVEKIN.
JEAN L. LE GORRE.